US008819673B1

(12) United States Patent
Wilkinson et al.

(10) Patent No.: US 8,819,673 B1
(45) Date of Patent: Aug. 26, 2014

(54) SYSTEMS AND METHODS FOR JAVA VIRTUAL MACHINE MANAGEMENT

(75) Inventors: Christopher Thomas Wilkinson, San Antonio, TX (US); Neelsen Edward Cyrus, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1344 days.

(21) Appl. No.: 11/753,519

(22) Filed: May 24, 2007

(51) Int. Cl.
  *G06F 9/455* (2006.01)
(52) U.S. Cl.
  USPC ............................................................ 718/1
(58) Field of Classification Search
  USPC .................................. 709/222, 223, 224, 226
  See application file for complete search history.

(56) References Cited

U.S. PATENT DOCUMENTS

| | | | | |
|---|---|---|---|---|
| 6,243,825 | B1* | 6/2001 | Gamache et al. .............. | 714/4.4 |
| 6,851,111 | B2* | 2/2005 | McGuire et al. .............. | 717/166 |
| 7,653,833 | B1* | 1/2010 | Miller et al. .................... | 714/13 |
| 7,890,689 | B2* | 2/2011 | Lam et al. .......................... | 711/6 |
| 8,234,640 | B1* | 7/2012 | Fitzgerald et al. ................. | 718/1 |
| 2002/0040470 | A1* | 4/2002 | Guthrie et al. ................. | 717/126 |
| 2002/0099753 | A1* | 7/2002 | Hardin et al. ...................... | 709/1 |
| 2004/0128670 | A1* | 7/2004 | Robinson et al. ................. | 718/1 |
| 2007/0078988 | A1* | 4/2007 | Miloushev et al. ........... | 709/227 |
| 2007/0083588 | A1* | 4/2007 | Keller et al. ................... | 709/202 |
| 2007/0250930 | A1* | 10/2007 | Aziz et al. ....................... | 726/24 |
| 2007/0266383 | A1* | 11/2007 | White ............................... | 718/1 |
| 2008/0034365 | A1* | 2/2008 | Dahlstedt .......................... | 718/1 |
| 2008/0098392 | A1* | 4/2008 | Wipfel et al. ..................... | 718/1 |
| 2008/0098457 | A1* | 4/2008 | Carter .............................. | 726/2 |
| 2008/0189700 | A1* | 8/2008 | Schmidt et al. ................... | 718/1 |

OTHER PUBLICATIONS

Java-Virtual-Machine.net, "Java Virtual Machine—All about JVMs," http://java-virtual-machine.net/, 2007, downloaded May 23, 2007, 1 page.
Lougher, R., "JamVM," http://jamvn.sourceforge.net/, Feb. 4, 2007, downloaded May 23, 2007, 3 pages.
Venners, B., "The lean, mean, virtual machine," *JavaWorld*, http://www.javaworld.com/cgi-bin/mailto/x_java.cgi, 1996, downloaded May 23, 2007, 7 pages.
Wikipedia®, "Java Virtual Machine," http://en.wikipedia.org/wiki/Java_Virtual_Machine, May 11, 2007, downloaded May 23, 2007, 5 pages.

* cited by examiner

*Primary Examiner* — Charles Swift
(74) *Attorney, Agent, or Firm* — Eric Sophir; Dentons US LLP

(57) ABSTRACT

A virtual machine (VM) management utility tool may deploy an object model that may persist one or more virtual machine dependencies and relationships. Through a web front-end interface, for example, the VMs may be started in a specific order or re-booted, and the tool automatically determines the additional VMs that need to be re-booted in order to maintain the integrity of the environment. Through the web interface, for example, the object model may be managed, and start-up orders or VM dependencies may be updated. For VMs that may not start under load, the object model may block access to the VM until the VM is fully initialized.

21 Claims, 10 Drawing Sheets

SYSTEMS AND METHODS FOR JAVA VIRTUAL MACHINE MANAGEMENT

BACKGROUND

Typically, virtual machines (VMs), such as Java virtual machines (JVMs) tend to be self-contained, and tend to be independent of other VMs such that they not rely on other VMs. However, as web application server farms continue to grow, dependencies may appear among the VMs within an enterprise. Because of such dependencies, specific VM start orders must be adhered to or problems, such as outages, may occur. Additionally, these dependencies may need to be taken into account when VMs may be re-booted, e.g., to correct an issue or to pick up an additional configuration parameter. When a VM re-boot occurs, one or more dependent VMs may also need to be re-booted to ensure proper functionality.

Additionally, some VMs may not start under load. For example, a request may not be made to a VM as it may be initializing. Furthermore, there are some VMs that should not be started. Such VMs may include those that may not be ready to be used yet, and those that may not be ready to go to production yet. Unfortunately, a user may not easily manage VMs, VM dependencies, and actions that may be performed on VMs.

SUMMARY

An interface may be provided that allows a user to select actions, such as re-boot or do not start, for example, that may be associated with at least one virtual machine (VM). It may then be determined if a VM has any dependencies, and these dependencies may be taken into account when the action may be performed or otherwise implemented. In this manner, the VM along with its dependent VMs may be started in a proper order or properly re-booted, for example.

A VM management utility tool may deploy an object model that may persist all the VM dependencies and relationships. Through a web front-end interface, for example, the VMs may be be started in a specific order or re-booted, and the tool automatically determines the additional VMs that need to be re-booted in order to maintain the integrity of the environment. Through the web interface, for example, the object model may be managed, and start-up orders or VM dependencies may be updated. For VMs that may not start under load, the object model may block access to the VM until the VM is fully initialized.

BRIEF DESCRIPTION OF THE DRAWINGS

The foregoing summary, as well as the following detailed description, is better understood when read in conjunction with the appended drawings. For the purpose of illustrating the claimed subject matter, there is shown in the drawings example constructions of various embodiments; however, the invention is not limited to the specific methods and instrumentalities disclosed.

DETAILED DESCRIPTION

The subject matter of the described embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described. Additionally, although some examples described herein may be directed to Java Virtual Machines (JVMs), it is contemplated that any virtual machines may be used.

Figure 1:
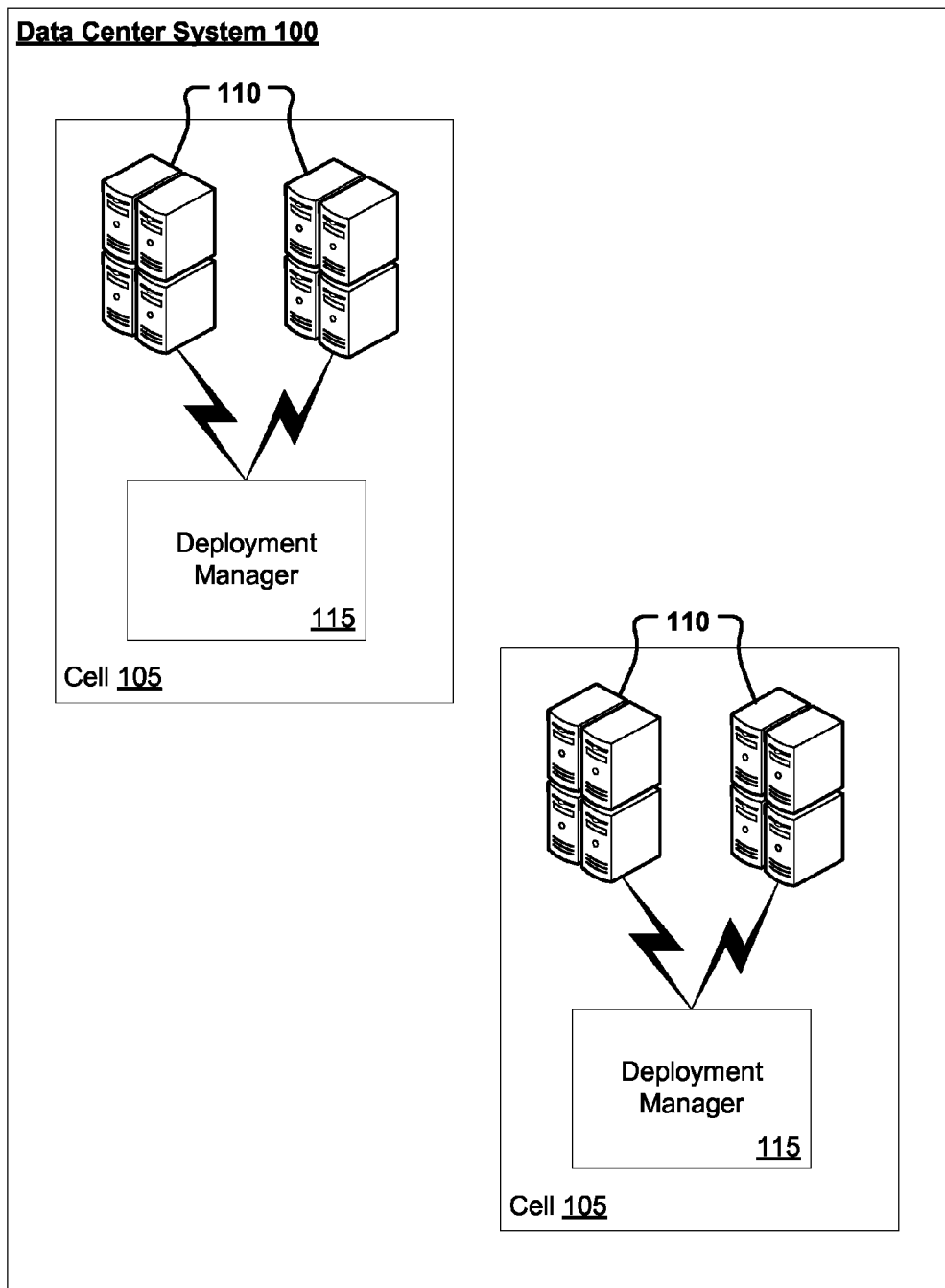
FIG. 1 depicts a block diagram of an example data center system in which aspects of the embodiments may be implemented.

FIG. 1 depicts a block diagram of an example data center system 100 in which aspects of the embodiments may be implemented. Data center system 100 may be a facility that may be used for housing a large amount of electronic equipment such as computer equipment, communications equipment, or the like. Data center system 100 may be maintained by, for example, a vendor or an organization such as a financial institution or an insurance institution to execute the software applications that may handle the core business and operational data of the vendor or organization. For example, the vendor or organization may include a bank, a credit union, an insurance company, or the like such that the vendor or organization may have a data center system such as data center system 100 where the vendor or organization may maintain, manage, and store data such as information corresponding to customer accounts and where transactions involving such data may be executed.

Data center system 100 may include one or more environmental controls such as, for example, air conditioning, fire suppression, raised flooring for air circulation, or the like. Data center system 100 may also include one or more redundant systems or components therein including, for example, one or more back up power supplies, redundant data communications connections, or the like according to one embodiment. Additionally, data center system 100 may include one or more routers, switches, gateways, or the like to provide, for example, a communication infrastructure between various components such as, for example, servers, databases, computer terminals, mainframes, or the like within data center system 100 and one or more entities external to data center system 100. In an example embodiment, such routers, switches, or gateways may deploy network security elements including firewalls, Virtual Private Network (VPN) gateways, intrusion detection systems, or the like.

As shown in FIG. 1, in one embodiment, data center system 100 may include one or more cells 105. Cell 105 may include any combination of hardware components such as servers, processors, databases, storage drives, registers, cache, RAM memory chips, data buses, or the like and/or software components such as operating systems, database management applications, or the like. For example, cell 105 may include a collection of servers that may be implemented as separate structural and functional units of data center system 100 such that each of the cells, although part of data center system 100, may be at least partially self-contained and self-maintaining. For example, each of the cells 105 may store its own set of instructions to execute specific activities allocated thereto within data center system 100.

In one embodiment, cell 105 may include a deployment manager 115 in operative communication with one or more application servers 110. Deployment manager 115 may include an automated software application that may perform operating system and/or software application deployment to the one or more application servers 110.

Application servers 110 may include any combination of hardware components such as processors, databases, storage drives, registers, cache, RAM memory chips, data buses, or the like and/or software components such as operating systems, database management applications, or the like. According to one embodiment, application servers 110 may include a server computer on a computer network dedicated to running certain software applications that may manage, execute, and maintain the business logic and data of, for example, the vendor or organization of data center system 100. According to one embodiment, application servers 110 may include, for example, Java application servers such as J2EE application servers that may provide standards for various web components and/or applications that may be managed in data center system 100.

Within each application server 110 may be one or more virtual machines (VMs) such as, for example, Java virtual machines (JVMs). The VMs that may implemented within application servers 110 may be dependent upon other VMs within the application servers 110 such that if one VM may malfunction additional VMs dependent thereon may also malfunction, as described in more detail herein. Additionally, each of the VMs that may malfunction based on the dependencies may have to rediscover the VM from which it may have depended.

According to one embodiment, cell 105 may be selected by a user, for example. After selecting cell 105, one or more VMs may also be selected by a user. One or more actions such as do not start, start, re-boot, and/or stop may then be associated with each selected virtual machine within cell 105. For example, the user may choose from several actions that may be processed against the target VMs including, but not limited to, "Start," "Stop," "Bounce," and "Terminate." The "Start" action may start a VM that is currently not running. The "Stop" action may allow the VM to complete any in-flight transactions and gracefully close connections and then shut itself down. The "Bounce" action may perform the "Stop" action and then "Start" action on the VMs.

The "Terminate" action may halt the VM process and may be used if a VM process or thread may be hung and will not respond to normal stop procedures or "Stop" actions and/or if the VM process or thread may be causing an error condition. Additionally, VM dependencies and weights may be set for the selected VMs, which will be described in more detail below.

Figure 2:
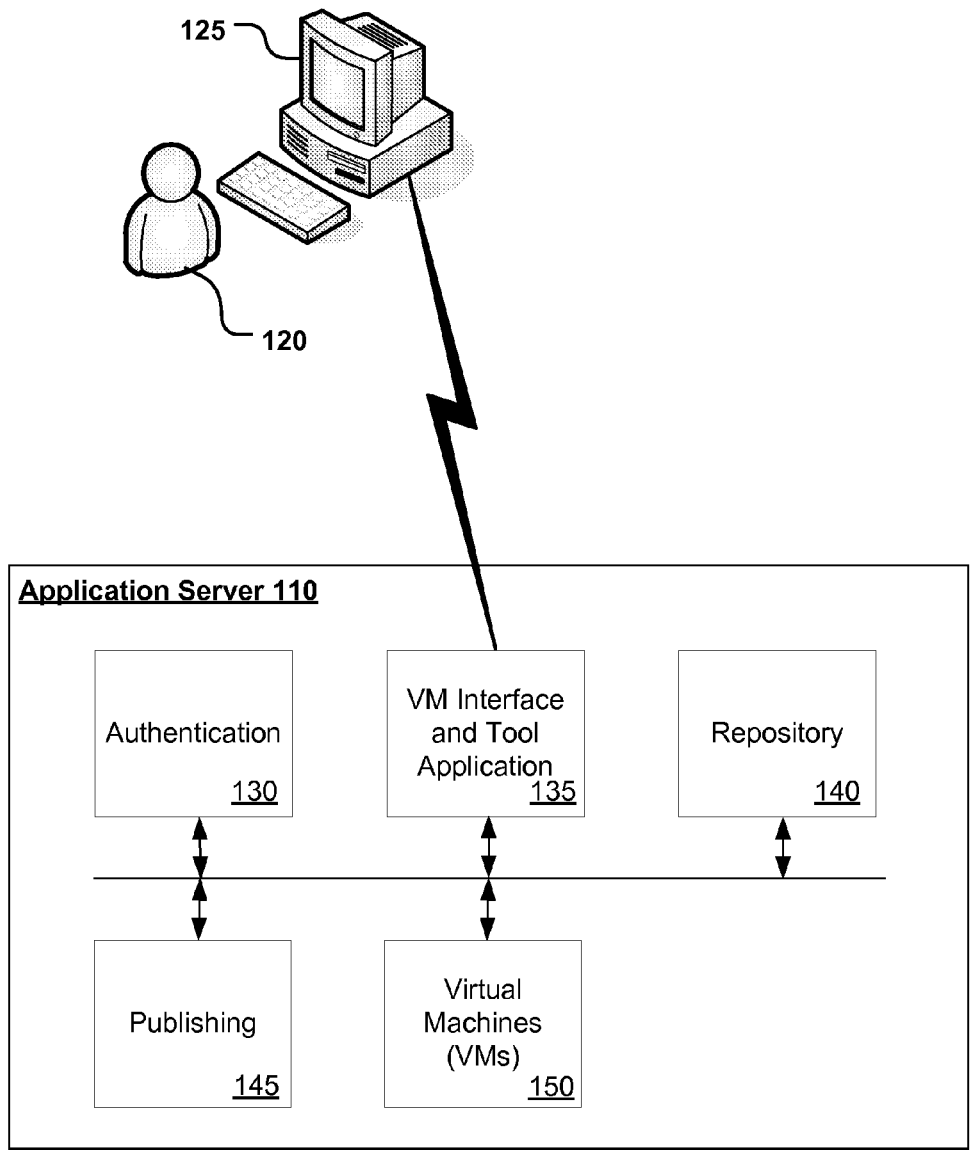
FIG. 2 depicts an example embodiment of an application server in communication with a user via an electronic device.

FIG. 2 depicts an example embodiment of application server 110 in communication with a user 120 via an electronic device 125. User 120 may include a network administrator or the like, of data center system 100 that may configure application server 110 according to one embodiment.

User 120 may communicate with application server 110 using, for example, electronic device 125. Electronic device 125 may include hardware components such as a processor, a graphics card, a storage component, a memory component, a memory card reader, an antenna, a communication port, a disc drive, or the like. Electronic device 125 may also include software components such as an operating system that may control the hardware components. Electronic device 125 may include any other suitable components such that user 120 may modify, manage, and execute virtual machines on application server 110, as described in more detail herein. According to example embodiments, electronic device 125 may be a computer, a PDA, a server, or the like.

Electronic device 125 may be in operative communication with application server 110 via a network such as a Virtual Private Network (VPN), a Local Area Network (LAN), a Wide Area Network (WAN), the Internet, or the like such that user 120 may access application server 110. Application server 110 may include any combination of systems and sub-systems. According to one embodiment, application server 110 may include authentication module 130, VM interface and tool application 135, repository module 140, publishing module 145, and one or more VMs 150. Authentication module 130, VM interface and tool application 135, repository module 140, publishing module 145, and the VMs 150 may be in operative communication with each other via, for example a bus or any other subsystem that may transfer data between computer components such as the modules in application server 110.

VM interface and tool application 135 of application server 110 may provide communication between electronic device 125 and various components and features of application server 110, for example. VM interface and tool application 135 may include software components such as operating systems, web-based management applications, or the like such that VM interface and tool application 135 may provide the overall infrastructure and may be the primary consumer of information to manage VMs that may be in application server 110, for example. VM interface and tool application 135 may also serve to interact and interface with the other functional components of application server 110 including authentication module 130, publishing module 145, repository module 140, and the VMs 150.

According to one embodiment, VM interface and tool application 135 may present an interface of a VM management utility tool to user 120 via electronic device 125. The VM management utility tool may deploy an object model that may provide interaction to modify and/or maintain VMs 150 including dependencies and relationships between the virtual machines. Through a web front-end interface, for example, VMs 150 may be started in a specific order or re-booted, and the tool may automatically determine the additional VMs that need to be re-booted in order to maintain the integrity of the environment. Additionally, through the web interface, for example, the object model may be managed, and start-up orders or VM dependencies may be updated. Thus, VM interface and tool application 135 may receive input or modifications regarding VM dependencies and relationships from user 120 via an interface such as a webpage according to an example embodiment.

In one embodiment, VM interface and tool application 135 may be implemented in data center system 100 such that it may communicate with each cell 105. VM interface and tool application 135 may provide a single, customizable tool for VM management and administration. Additionally, VM interface and tool application 135 may allow a user or network administrator to manage cells 105 and persist for unique configuration between cells. VM interface and tool application 135 may be configured to automatically query cell 105 that may be selected for a virtual machine such as VM 150. VM interface and tool application 135 may persist the object model in an Extensible Markup Language (XML) format such that modifications may be easily administered manually upon export. VM interface and tool application 135 may also provide for real-time VM states (up, down, etc.) and may include an action field for commands that can be run against VMs 150, for example.

Figure 4:
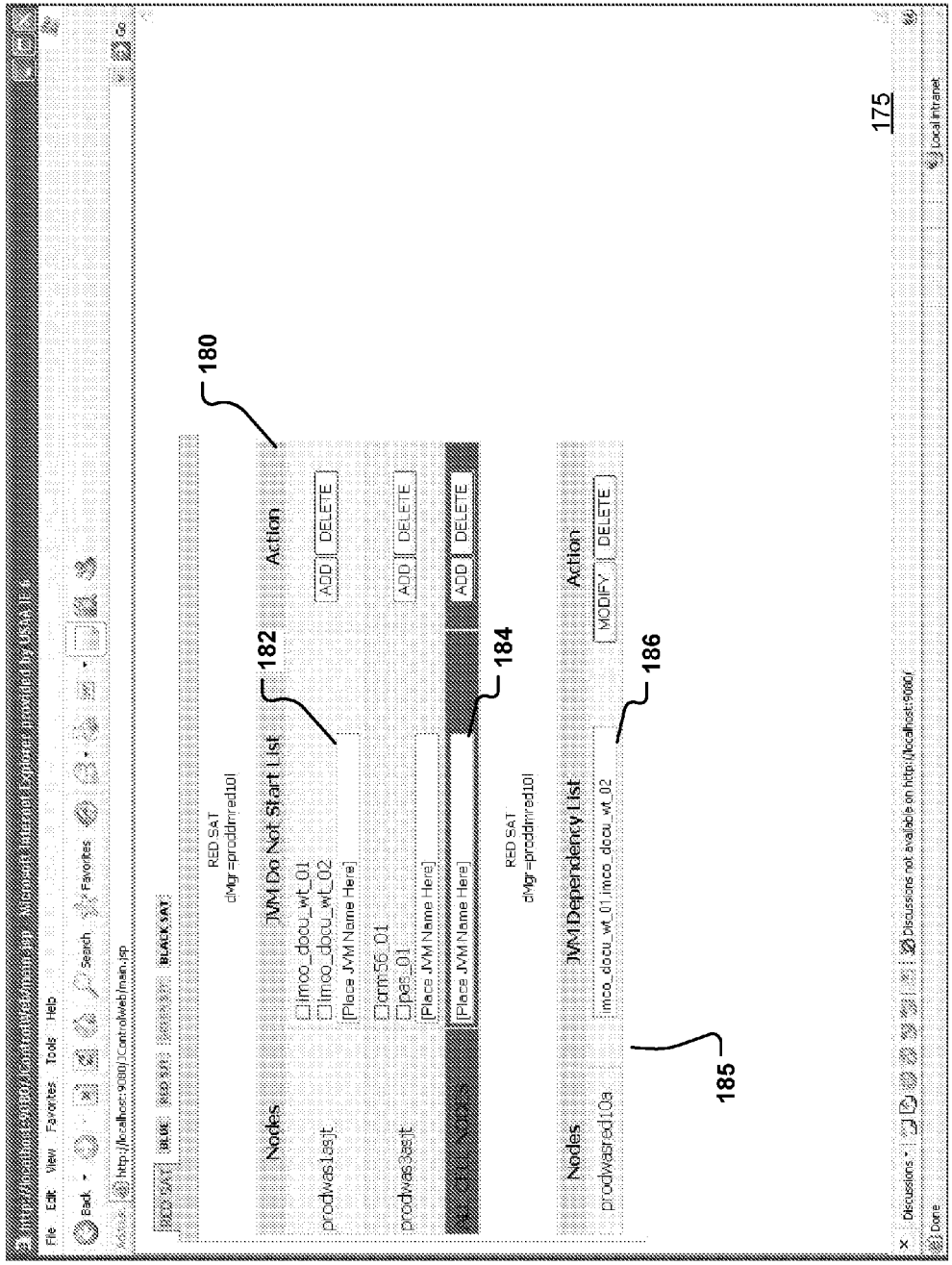
FIG. 4 depicts an example embodiment of an interface display of a virtual machine tool.
Figure 5:
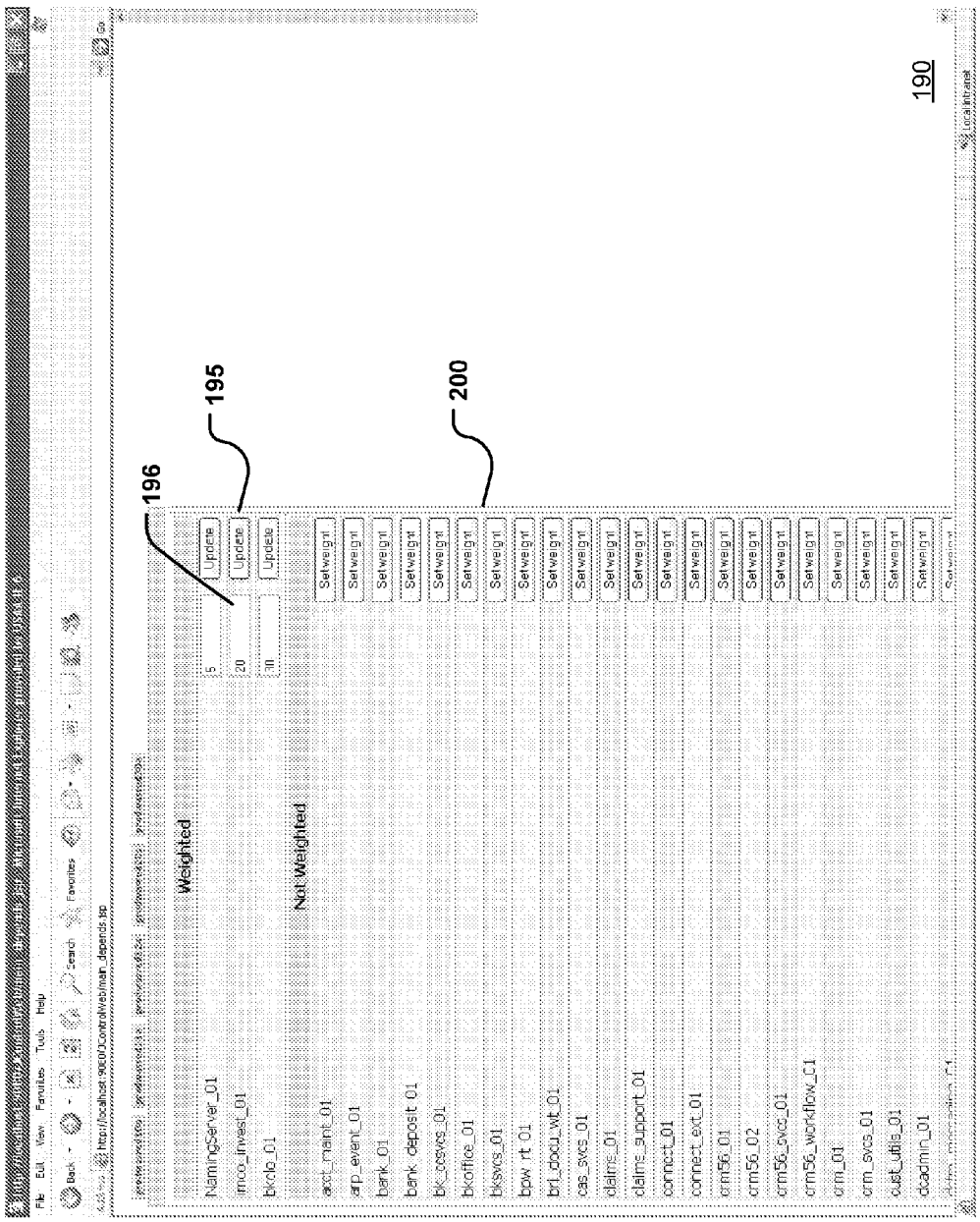
FIG. 5 depicts another example embodiment of an interface display of the virtual machine tool.

In one embodiment, the information that may be entered by user 120 into interface 175 and interface 190, described with respect to FIGS. 4 and 5 for example, to configure and manage the virtual machines may be stored in, for example, repository module 140. Alternatively, such information may also be stored in one or more databases within data center system 100 such that the information may be shared among multiple cells 105 to control virtual machines 150 therein.

Authentication module 130 may include any combination of hardware components such as processors, databases, storage drives, registers, cache, RAM memory chips, data buses, or the like and/or software components such that authentication module 130 may provide a mechanism for authentication of user 120 before any modification or management of virtual machines 150 may be made by user 120. Typically, users such as user 120 may be authenticated by supplying a credential such as an account number, username, Personal Identification Number (PIN), password, or the like before access to modify, for example, application server 110 and one or more virtual machines 150 may be granted.

Additionally, once a user has been authenticated, application server 110 may cache the authentication status to prevent unnecessary external authentication requests, for example. Authentication module 130 may perform the authentication itself. Additionally, authentication module 130 may delegate authentication authority to an authentication mechanism such as a web-based authentication service. In one embodiment, authentication module 130 may include bridges to various possible points of authentication such as the host application, the user's enterprise domain, or local cache of application server 110. Additionally, the passing of session-specific tokens, or other artifacts, to identify the context under which a user such as user 120 may interact with application server 110 may be managed by authentication module 130 in cooperation with web VM interface and tool application 135, according to one embodiment.

Application server 110 may also include publishing module 145. Publishing module 145 may include any combination of hardware components such as processors, databases, storage drives, registers, cache, RAM memory chips, data buses, or the like and/or software components. User 120 and/or processes internal to application server 110 may use publishing module 145 to manipulate, display, or manage data such as virtual machine information including, but not limited to, do not start list, weights, load lists, VM dependencies, VM relationships, or the like. Application server 110 may deliver data for virtual machines 150 in a variety of ways including, but not limited to, Hypertext Transfer Protocol (HTTP) and/or Secure Hypertext Transfer Protocol (HTTPS) for simple web-based access, Simple Main Transfer Protocol (SMTP), Web Services/Simple Object Access Protocol (SOAP), and Sharepoint for online review and collaboration of data. For example, according to one embodiment, publishing module 145 may generate interfaces such as webpages that may be displayed to user 120 via HTTP to manage virtual machine 150.

According to one embodiment, application server 110 may further include virtual machines 150. Virtual machines 150 may include a software program that may emulate a hardware system. For example, virtual machines 150 may be software that may create a virtualized environment between, for example, a computer platform and its corresponding operating system such that an end-user such as user 120 may operate software on an abstract machine. For example, virtual machines 150 may allow a number of discrete identical execution environments to run on a single computer, each with a different operating system such that applications written for one operating system may be executed on a machine which runs a different operating system.

Additionally, virtual machine 150 may include, for example, a Java virtual machine or the like, such that virtual machine 150 may include computer software that may isolate an application that may be housed on or implemented in, for example, application server 110. Because versions of the virtual machine 150 may be written for various computer platforms, any application written for virtual machine 150 may be operated on any of the platforms instead of having to produce separate versions of the application for each computer and operating system of application server 110. Thus, virtual machine 150 may provide flexibility among various hardware and/or software components.

Application server 110 may also include repository module 140. According to one embodiment, repository module 140 may provide persistent storage for application server 110. Repository module 140 may include, for example, a database, memory chips, hard drives, or any other suitable hardware components designed to store data. Repository module 140 may store applications and/or data provided to user 120 by the vendor via application server 110. For example, repository module 140 may store a information corresponding to virtual machine 150 such as virtual machine dependencies, virtual machine relationships, or the like.

Figure 3:
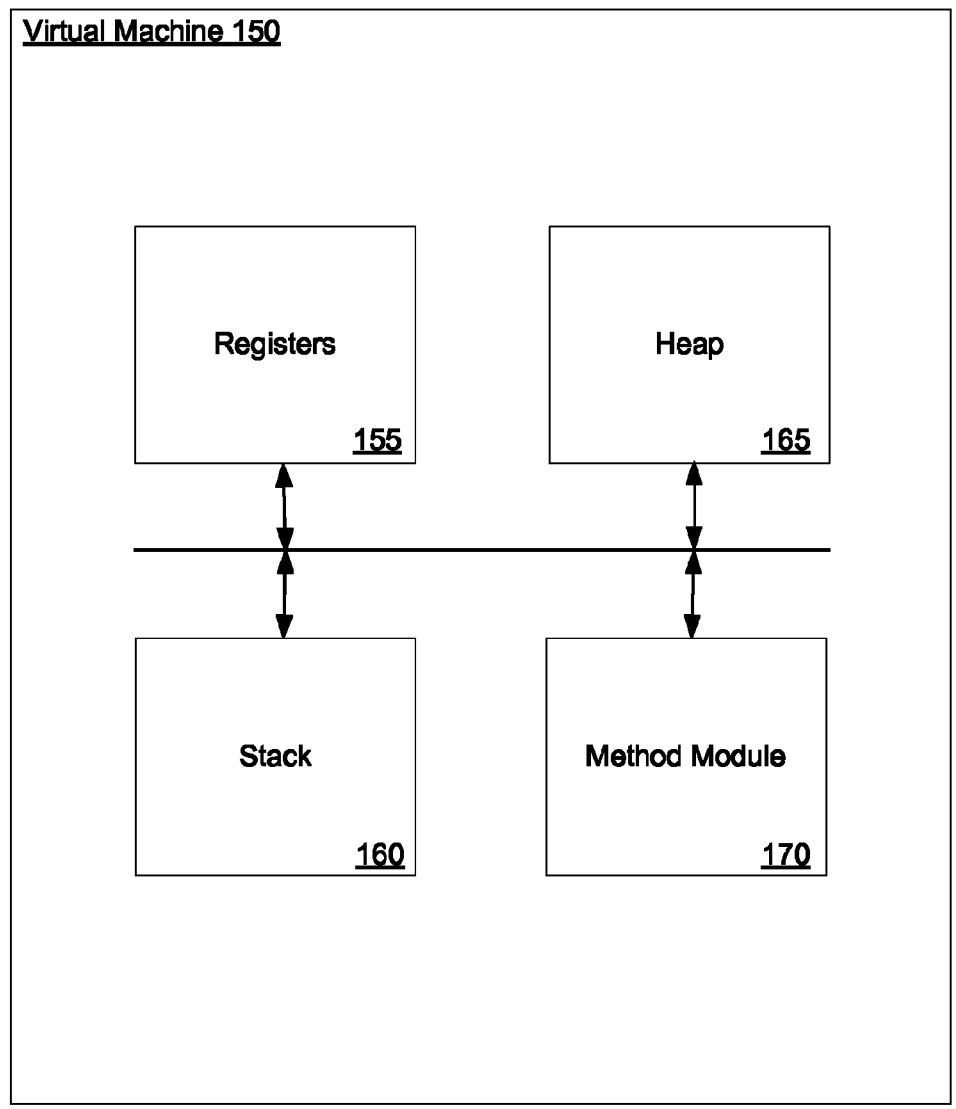
FIG. 3 depicts an example embodiment of a virtual machine.

FIG. 3 depicts an example embodiment of at least one virtual machine 150. According to one embodiment, virtual machine 150 may be, for example, a Java virtual machine. As described above, virtual machine 150 may include computer software that may isolate one or more software applications of application server 110. As shown in FIG. 3, virtual machine 150 may include virtual hardware such as one or more registers 155, stack 160, heap 165, and method module 170. Such virtual hardware including registers 155, stack 160, heap 165, and method module 170 may be abstract, similar to the virtual machine itself.

In one embodiment, virtual machine 150 may include an address size of, for example, 32 bits such that virtual machine 150 may address up to 4 Gigabytes (GB) of memory with each memory location containing one byte. Thus, each of the registers 155 may store a 32 bit address. Additionally, stack 160, heap 165, and method module 170 may reside somewhere within the 4 GB of addressable memory, for example. The exact location of these memory areas within application server 110, for example, may be a decision of the implementor or network administrator such as user 120 of each of the virtual machines 150.

Virtual machine 150 may include a program counter and registers 155 that may manage, for example, stack 160. Registers 155 may be a virtual implementation of a small, high-speed computer circuit that may hold values of internal operations, such as the address of the instruction being executed and the data being processed by, for example, virtual machine 150. According to one embodiment, virtual machine 150 may use the program counter to keep track of a location in memory that virtual machine 150 may be executing instructions. Additionally, registers 155 may point to various parts of a stack frame of stack 160 of the currently executing method. The stack frame of an executing method may hold the state for a particular invocation of the method, for example.

According to one embodiment, virtual machine 150 may include method module 170. Method module 170 may include virtual hardware such as virtual storage units and may include one or more byte codes that may represent one or more methods that may be performed by virtual machine 150. The program counter may point to the byte codes in method module 170. Also, the program counter may be used to keep track of the thread of execution. After a byte instruction has been executed within memory module 170, the program counter may store the address of the next byte instruction to execute. After execution of instruction, virtual machine 150 may set the program counter to the address of the instruction that may immediately follow the previously executed instruction in one embodiment.

Virtual machine 150 may further include stack 160. Stack 160 may include a virtual section of memory that may be used for temporary storage of information in which the item most recently stored may be the first to be retrieved. In one embodiment, stack 160 may be used to store parameters for and results of bytecode instructions and to pass parameters to and return parameters from one or more methods that may be provided within memory module 170. Stack 160 may include a stack frame that may include, for example, the state of a method invocation associated with one or more methods in method module 170. In one embodiment, stack 160 may also include one or more local variables, an execution environment, and an operand stack.

In an example embodiment, virtual machine 150 may also include heap 165. Heap 165 may be component of virtual machine 150 where objects of, for example, an application such as a Java program may be run. Heap 165 may be responsible for allocating memory of virtual machine 150. For example, the runtime environment of an application such as a Java program may not be able to allocate free memory directly. Rather, the runtime environment may keep track of the references to each object on heap 165, and may automatically free the memory occupied by such objects that may no longer be referenced.

FIG. 4 depicts an example embodiment of an interface 175 of a VM management utility tool that may be presented by application server 110 to user 120 according to one embodiment. As shown in FIG. 4, interface 175 may be a webpage generated using, for example, HTML, Java, or the like. According to one embodiment, publishing module 145 may generate interface 175 using data or virtual machine information from repository module 140, shown in FIG. 2. Interface 175 may then be presented to user 120 via VM interface and tool application 135. Alternatively, interface 175 may be stored in and presented to user 120, for example, by VM management interface and tool application 135. For example, user 120 may log into the application server 110 via electronic device 125 by supplying credentials such as an account number, a username, a PIN, a password, or any other unique identifier for user 120.

Publishing module 145 may receive information regarding the current weights and dependencies of various VMs such as virtual machine 150. Publishing module 145 may generate an interface such as interface 175 with virtual machine information such as the current weights and dependencies and interactive virtual machine management features that may be used to modify and manage the current weights and dependencies. Interface 175 may be presented to user 120 such that interface 175 may allow for the creation, maintenance, and management of JVM properties, such as actions and weight assignments for dependency mappings, for example.

In one embodiment, interface 175 may include do not start block 180. Do not start block 180 may include one or more nodes that represent one or more cells such as cells 105, shown in FIG. 1. Each cell or node may include one or more virtual machines such as virtual machine 150. Within each cell, an administrator such as user 120, may add one or more virtual machines to the do not start list using, one or more buttons in the action area of do not start block 180. For example, the node that may be included in do not start block 180 may represent cells that may include one or more virtual machines that may currently be active on a do not start list. An administrator such as user 120 may add additional virtual machines such as virtual machines 150, within a node or cell to the do not start list by entering a name in VM text field 182 and clicking the corresponding add button.

Additionally, a user may select a check box of one or more of the virtual machines within each node and delete them from the do not start list by clicking the corresponding delete button. In one embodiment, the user may add a cell node or one or more cells that may have virtual machines the user may want to add to the do not start list. For example, before a virtual machine within a cell such as cell 105 may be added to the do not start list, a user may add the cell by entering the cell name in cell name text block 184 and selecting the corresponding add button. After adding the cell node, the user may then elect to add one or more virtual machines within the cell to the do not start list.

Interface 175 may also include a dependency management block 185. Dependency management block 185 may allow a user to add one or more dependencies between, for example, virtual machines within a node. For example, a user may input one or more virtual machines in dependency text block 186. The user may then select the modify button at which point the user may elect to establish a relationship between the virtual machine entered in dependency text block 186. For example, the user may be directed to another interface that may provide the user an interface to graphically relate the virtual machines to one another in, for example, a hierarchy.

FIG. 5 depicts an example embodiment of an interface 190 of a VM management utility tool that may be presented by application server or 110 to user 120 according to one embodiment. As shown in FIG. 5, interface 190 may be a webpage generated using, for example, HTML, Java, or the like using publishing module 145 and/or VM Interface and Tool Application 135, as described above. Interface 190 may allow a user such as user 120 to weight one or more virtual machines such as virtual machines 150. According to an embodiment, a VM such as virtual machine 150 may form dependencies on the service provided by other VMs. For example, a VM may provide a service that may need to be running and available prior to starting any other VM that has a dependency on the provided service. VM weights may be used to ensure that all the VMs initialize correctly and can service requests. For example, a VM "X" may provide a naming service that may return a resource location reference, and, in one embodiment, a VM "Y" and VM "Z" may need this service to connect to the appropriate resource for the environment that the VM "Y" and VM "Z" may be running. If VM "X" may not be available when VM "Y" and VM "Z" may be initialized, the VM "Y" and VM "Z" may not function properly. To ensure the proper start order, numeric weights may be assigned to the VMs such as, for example, VM "X" may have a weight of 5, VM "Y" may have a weight of 99, and VM "Z" may have a weight of 99.

To provide weights to a VM such as virtual machine 150, interface 190 may include weighted block 195 and not weighted block 200. For example, a user may enter or update the weight of a virtual machine by entering a different weight value in weight text block 196 and selecting the update button within weighted block 195. Additionally, a user may set one or more weights of additional non-weighted virtual machines using not weighted block 200. For example, the user may select a set weight button presented next to each virtual machine within, for example, the cells that may reside in the data center system. According to one embodiment, interface 190 may then be refreshed such that the virtual machine may be removed from the not weighted block 200 and may be displayed in the weighted block 195. The user may then enter a weight value in weight text block 196 and select the update button to assign a specific weight to the newly added machine.

In one embodiment, the information that may be entered into interface 175 and interface 190 may be stored in, for example, repository module 140, such as that described with respect to FIG. 1. Alternatively, such information may also be stored in one or more databases within data center system 100 such that the information may be shared among multiple cells 105 to control virtual machines 150 therein. The information may be stored one or more databases or in repository module 140 as an XML file, for example.

Figure 6:
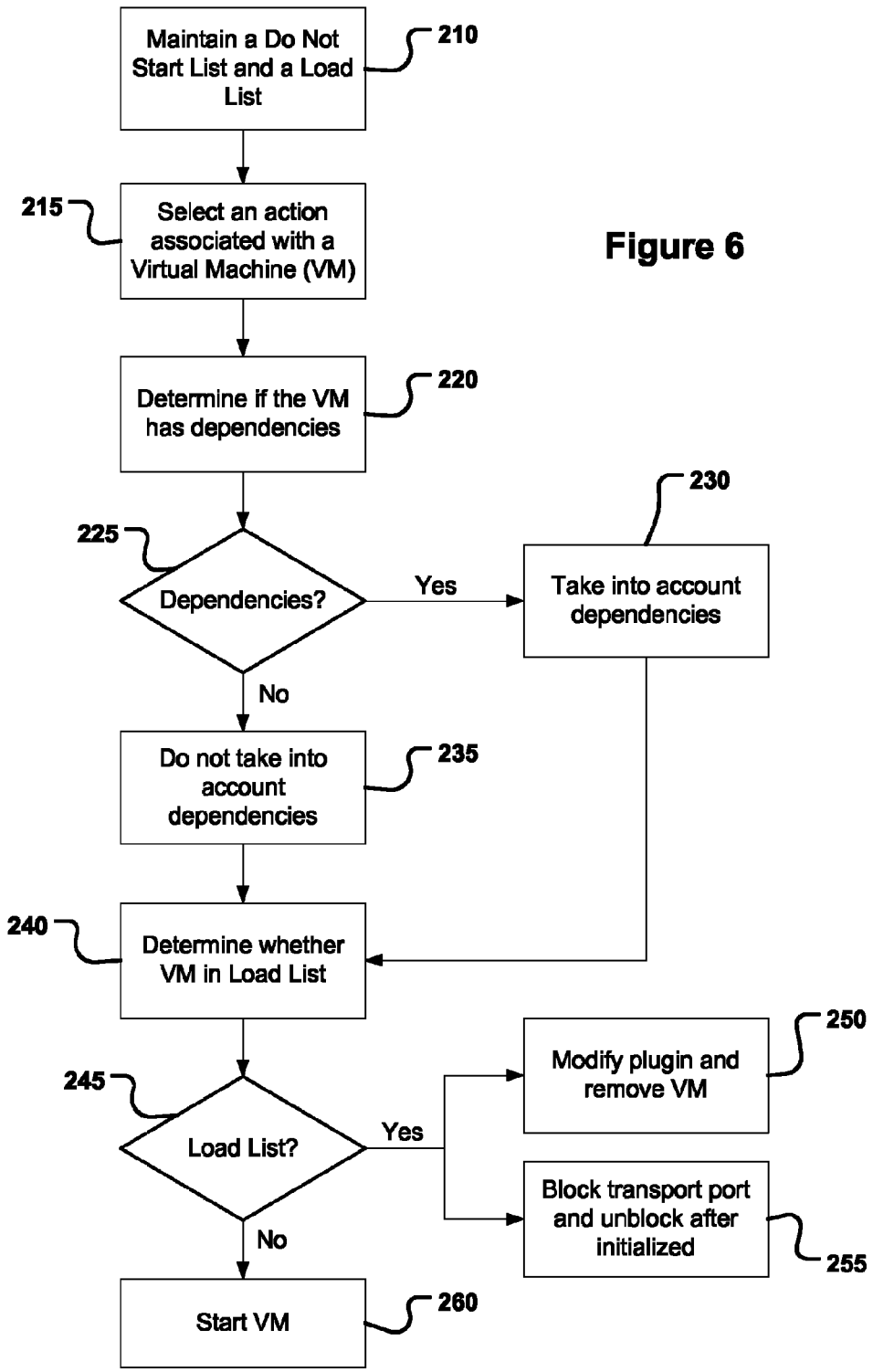
FIG. 6 depicts a flow diagram of an example method of virtual machine management according to one embodiment.

FIG. 6 depicts a flow diagram of an example method of virtual machine management, such as JVM management. As shown in FIG. 6, at 210, a data center system, such as data center system 100 described with respect to FIG. 1, may maintain a do not start list and a load list of each virtual machine. For example, a data center may include one more or more cells such as cells 105. Each of the cells may include a deployment manager such as deployment manager 115 and one or more application servers 110. Within each application server may be one or more virtual machines. The virtual machines may include a software program that may emulate a hardware system. Additionally, the virtual machines may include a Java virtual machine or the like, such that the virtual machine may include computer software that may isolate the application that may be housed on or implemented in, for example, the application server.

Any component of the data center system including each cell or application server, for example, may maintain a list of virtual machines that may not be started or a list of virtual machines to be loaded. For example, each cell may maintain a do not start list that may include one or more virtual machines that may not be started according to one embodiment. Additionally, each cell may maintain a load list that may include one or more virtual machines that may be prevented from starting under load such that a request may not be made to the virtual machine as the virtual machine may be initializing. In one embodiment, the do not start list and load list may be maintained and managed by a user via an interface such as interface 175 and 190.

At 215, an action associated with a VM may be selected. For example, a user or network administrator may provide a selection of an action to be performed by one or more VMs. Alternatively, cells and/or components of the data center system may automatically select an action based on, for example, a queue of actions stored in a storage component. Thus, a queue may be provided that stores the actions that may be automatically provided to, for example, the virtual machines of a cell and application server in the data center system. According to one embodiment, the actions may include re-booting or bounce, starting, initiating, stopping, terminating, or the like.

At 220, the data center system may determine whether the VM has any dependencies. In one embodiment, a VM may have additional VMs dependent therefrom. For example, a first VM may have one or more VMs such as a second VM, a third VM, or the like that may depend thereon such that when the first VM may malfunction or stop performing, the second VM and the third VM may also malfunction or stop performing.

At 225, if the VM has a dependency, at 230, the dependency may be taken into account when the action may be performed by the virtual machine. Thus, if a user selects one or more actions, at 215, when the virtual machine may be performing those actions, the dependency of other virtual machines determined, at 220, may be taken into account. For example, when an action may be selected for a particular VM, a dependency map, such as a database, or local XML file that includes the VM dependencies, may be checked to determine if any other VMs may be dependent on the service that the particular VM may be currently providing. If such dependencies exist based on the check of the dependency map, the dependent VM may automatically be added to the action list. Thus, if VM "X" provides a service to VM "Y" & VM "Z" and user may want to "Stop" VM X, the interface will auto select the stop action for "Y" & "Z" also. If a user wants to start VM "Y" the system may check the dependency map and may automatically select to "Start" VM "X" as well. During these actions, the system may also make sure that VM "X" is fully initialized before starting VM "Y."

At 225, if the VM does not have a dependency, at 235, no dependency is taken into account when the action is performed by the virtual machine. Thus, if a user selects one or more actions, at 215, the virtual machine may perform the action regardless of the other virtual machines present because no dependency may currently exist.

The system may further determine, at 240, whether the VM may be in a load list. For example, the data center system may include a load list that may be stored in one or more components such as within each cell, application server, or the like. The load list may include a list of the virtual machines that may be prevented from starting under load. In one embodiment, the load list may include a list of the virtual machines to which a request may not be made to the virtual machine as the virtual machine may be initializing.

At 245, if the VM may be in the load list, at 250, the plugin may be modified and the VM may be removed. For example, a VM may not be initialized if the VM is under load or in the load list. Thus, in one embodiment, the VM may not receive requests during initialization or loading to prevent the VM from initializing incorrectly or from throwing an error to the calling process. When a bounce or start action may be invoked on a VM in the load list, the plugin may be modified to ensure that the VM does not receive any requests. The plugin may include a file such as an XML based file that includes the identity and location of all VMs within a particular cell that may handle requests from a user. Alternatively, at 255, the transport port may be blocked. After initialization of the VM, the transport port may then be unblocked. For example, a VM may utilize a unique transport port, in order to process requests. Such a transport port may be blocked at the Operating System level to simulate that the VM may no longer be accessible on the network. The plugin may monitor the transport ports to determine a VM's network availability. If the plugin may not reach the transport port after certain number of attempts, the plugin may no longer route request to that particular VM. After the VM has been restarted and is fully initialized, the transport port at the Operating System level may be unblocked and the plugin may then enable the VM to start receiving network traffic.

At 245, if the VM is not in the load list, at 260, the virtual machine may be started and the action may be performed on the virtual machine. As described above, dependencies may be taken into account when performing the action including re-booting the virtual machine, starting the virtual machine, or like.

Figure 7:
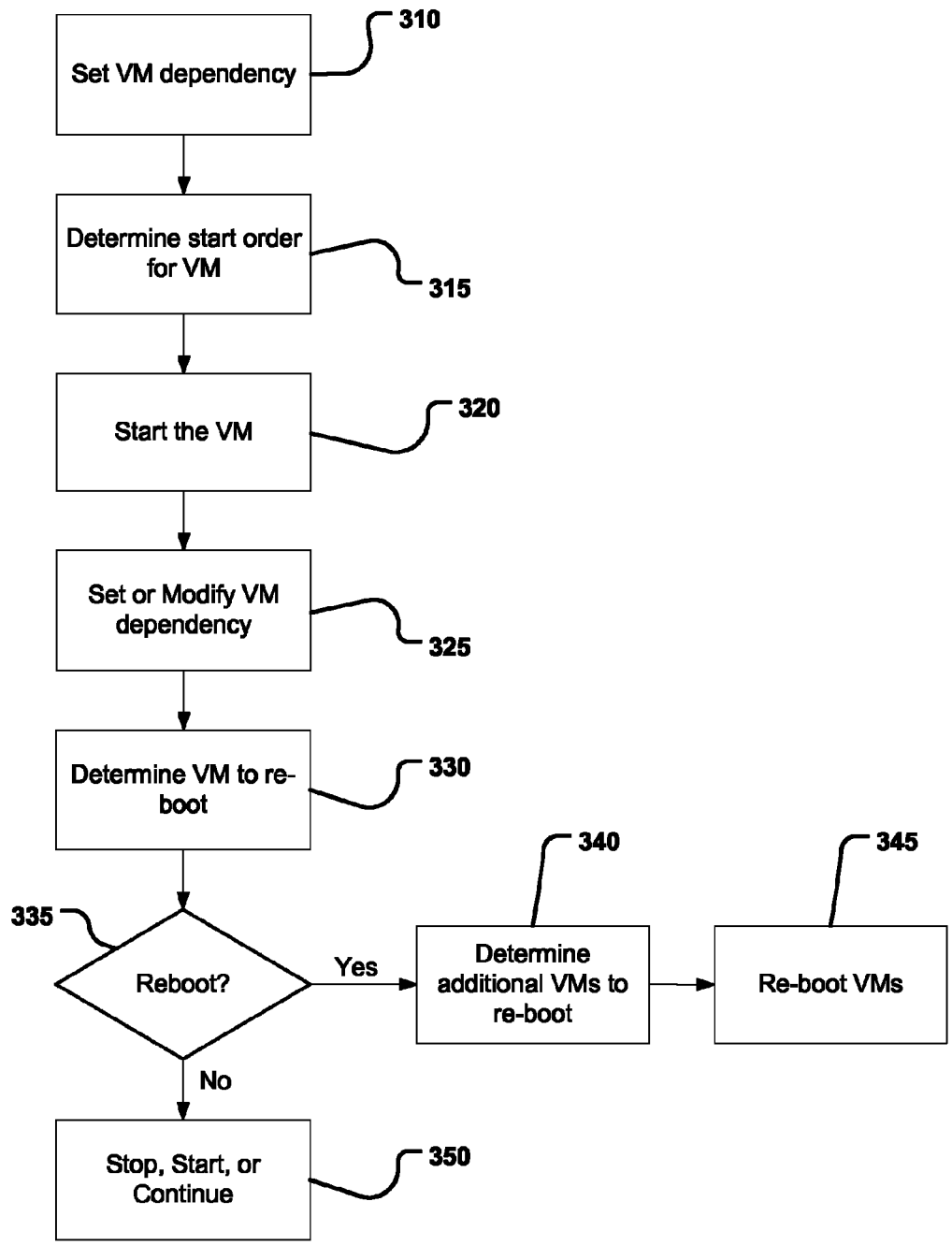
FIG. 7 depicts a flow diagram of an example method of managing a virtual machine (VM) according to one embodiment.

FIG. 7 depicts a flow diagram of another example method of managing a VM, such as a JVM, according to one embodiment. As shown in FIG. 7, at 310, a user or a network administrator may set one or more dependencies of one or more VMs in a cell of a data center system. In one embodiment, the virtual machines may reside, for example, within an application server such as application server 110. Such dependencies may be set using, for example, VM interface and tool application 135, via an interface such as interface 175 and 190, for example.

At 315, the components of data center systems such as the cell, the deployment manager, the application server, or the like may determine a start order for one or more virtual machines. In one embodiment, the start order may be a function of the virtual machine dependencies that may be set at 310. For example, a first VM may need to be started before a second VM dependent upon the first VM. Additionally, the start order may be a function of a weight associated with the VM. For example, each of the VMs may have a weight value corresponding thereto. In one embodiment, the VMs with a lower weight value may be higher, or given greater priority, in the start order than a VM with a lower weight value. Thus, a first VM with a weight value of 10, for example, may be first in a start order with a second VM that may have a weight value of 20 being second in the start order and a third VM that may have a weight value of 30 being third in the start up order. Additionally, VMs with equal weight values may be started in parallel. According to ome embodiment, a VM's numeric weight may be determined by an overall VM dependency tree. The VM dependency tree may allow a more granule control mechanism to provide full cell VM initialization. If a VM relies on other VM services, the VM may not start until all dependent VMs may be fully initialized. As described above, the VM with the lowest numeric weight must be "Started first. All VMs that are not dependent on any other VM may receive a weight value such as "99" such that the VMs may be "Stopped, Started, or Bounced" without regard to any other VM.

After determining the start order at 315, the virtual machine may be started at 320. For example, the virtual machine may run an application for the data center system. In one embodiment, the virtual machine may run a software program that may emulate a hardware system. Additionally, the virtual machines may run computer software that may isolate the application that may isolate one or more software applications implemented in, for example, the application server.

At 325, the user or a network administrator may set or modify the virtual machine dependencies even after the virtual machine may have been started at 320. For example, the user may log into the application server at which point the user may change one or more dependencies through an interface of a VM management utility tool such as interface 175 or interface 190.

At 330, the user or one or more components of the data center system may determine whether to re-boot one or more virtual machines. For example, the user may want to re-boot one or more virtual machines after setting or modifying the dependencies at 325. The user may do so by selecting a re-boot action that may be used to determine the one or more virtual machines to re-boot. Additionally, the components of the data center system such as the cell, deployment manager, application server may store one or more criteria to automatically re-boot machines if, for example, maintenance may have been done on the various components of the data center system.

At 335, if one or more virtual machines may be re-booted, at 340, the components of the cell such as the deployment manager may determine whether additional virtual machines may be re-booted up within, for example, application server based on the dependencies. For example, if a first VM may have a second VM dependent thereon, the second VM may also need to be re-booted if, based on the determination at 330, first VM may need to be re-booted. Then, at 345, the additional virtual machines may be rebooted, based on the determination at 340.

At 335, if one or more virtual machines are not to be re-booted, at 350, the virtual machine may be stopped, started, or may continue running. For example, a user may set or modify the virtual machine dependencies at 320. However, there may be no determination that the virtual machine may need to be re-booted, at 330. Therefore, at 350, a virtual machine may continue to run, may be stopped, or maybe started, by for example the user. Additionally, at 350, a determination may be made on whether one or more VMs may not start under load such that access to the VM may be stopped until the VM is fully initialized.

Figure 8:
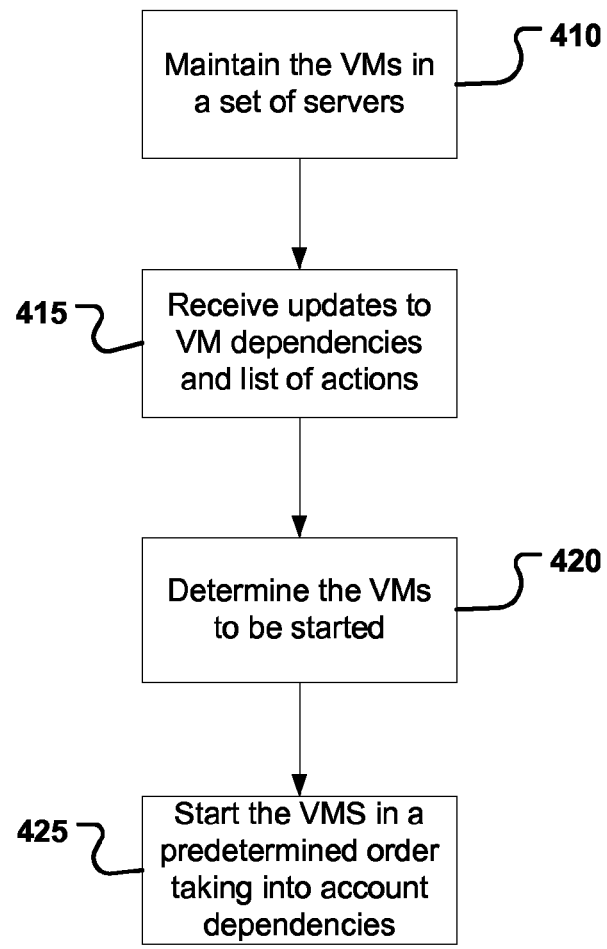
FIG. 8 depicts a flow diagram of an example method of starting a VM according to one embodiment.

FIG. 8 is a flow diagram of an example method of starting a VM, such as a JVM. As shown in FIG. 8, at 410, a data center system such as data center system 100, may include a cell such as cell 105, that may maintain one or more servers such as application servers 110. In one embodiment, each of the applications servers 110 may include one or more virtual machines such as virtual machines 150.

At 415, the data center system components such as the cell may receive updates to virtual machine dependencies and a list of actions that may be performed by the virtual machines. For example, a user or a network administrator may modify or update one or more dependencies of one or more virtual machines via an interface such as interfaces 175 and 190. The cell may receive and store these updated dependencies such that the dependencies may be taken into account when an action may be performed on the virtual machine. The user may also add one or more actions including, but not limited to, do not start, start, re-boot, stop, terminate, bounce, or the like to the list of actions that may be performed by the virtual machines. Additional actions such as "Stop Application", "Start Application", "Stop Listener", "Start Listener", "Stop Queue", "Start Queue", "Disable/Enable Resource" may be performed to take actions against objects within each VM.

At 420, the data center system components such as the cell may determine the virtual machines that may be started. For example, the cell may determine which, if any, virtual machine may be invoked by, for example, a user or by one or more components of the data center system such as the deployment manager. The data center system components such as the cell may also check a predetermined list of actions associated with each VM to determine the virtual machines that may be started. According to one embodiment, the list of actions may include start, do not start, do not start under load, and/or re-boot.

After determining the virtual machines to be started, at 420, the cell may start the virtual machines in a predetermined order taking into account the dependencies at 425. For example, the components of data center systems such as the cell, the deployment manager, the application server, or the like may determine a start order for one or more virtual machines. In one embodiment, the start order may be a function of the virtual machine dependencies that may be mapped using dependency mapping. The dependency map may include a database or local XML file that may indicate the relationship that one VM may have with another VM. For example, the dependency map may include a dependency relationship identified by "vm_X:vm_A,vm_C." In one embodiment, such a dependency relationship may indicate that, if an action may be taken against "vm_X," the action may also affect "vm_A" and "vm_C" as well. Thus, if "vm_A" may be bounced, for example, "vm_A" & "vm_C" may also be bounced as well. For example, a first VM may need to be started before a second VM dependent upon the first VM. In one embodiment, the dependencies of the VMs may be based on predetermined weights associated with each VM. For example, each of the VMs may have a weight value associated therewith. The weight value may be used to determine the start order and/or dependencies. For example, a first VM with a weight value of 40 may be started before a second VM with a weight value of 20. VMs with equal weight values may be started in parallel.

Exemplary Computing and Networking Environments

Figure 9:
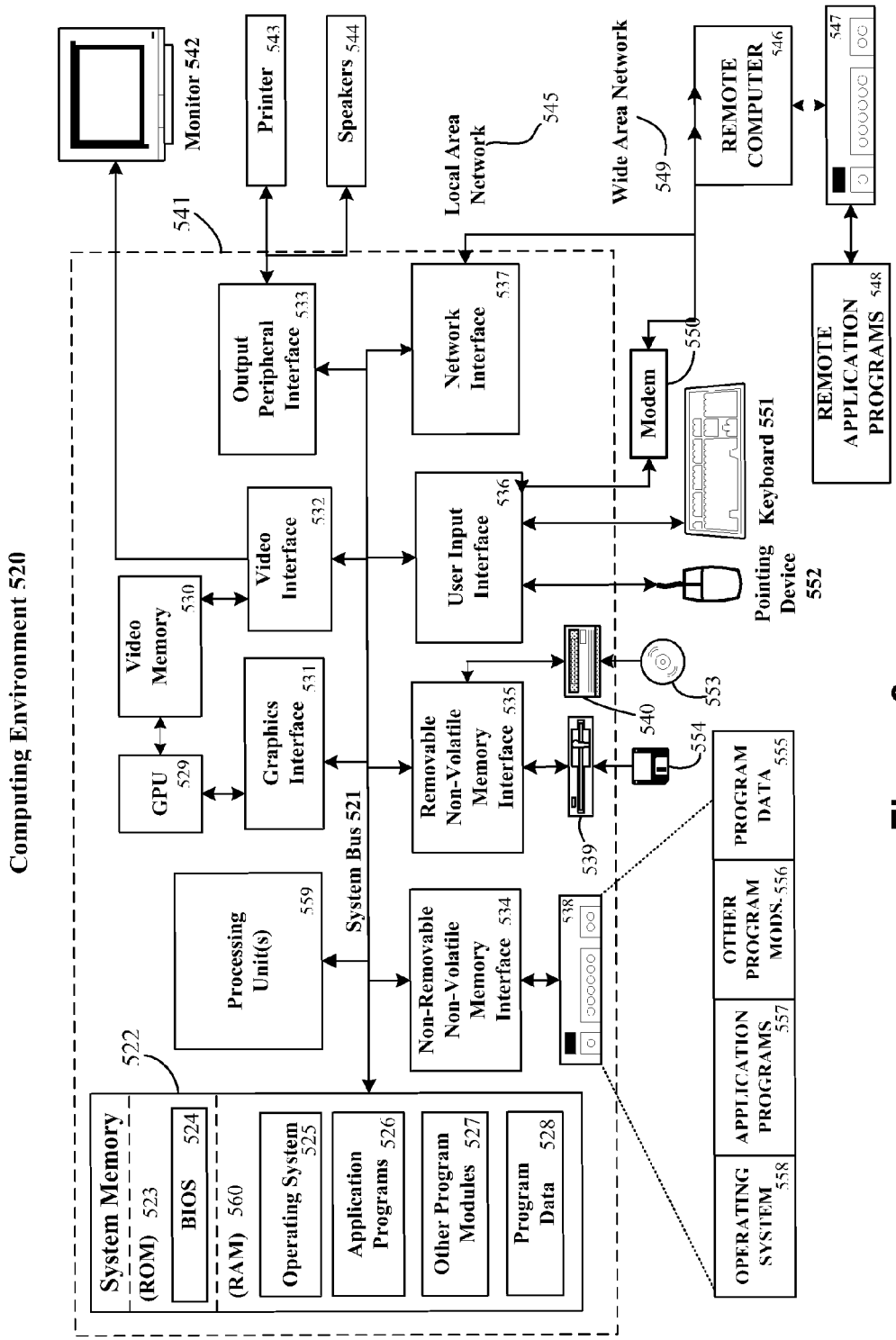
FIG. 9 illustrates a block diagram representing an exemplary computing device environment suitable for use in conjunction with aspects of the invention.

FIG. 9 shows a block diagram representing an exemplary computing device suitable for use in conjunction with implementing aspects of the invention. For example, the computer executable instructions that carry out the processes and methods described herein may reside and/or be executed in such a computing environment as shown in FIG. 9. The computing system environment 520 is only one example of a suitable computing environment and is not intended to suggest any limitation as to the scope of use or functionality of the presently disclosed subject matter. Neither should the computing environment 520 be interpreted as having any dependency or requirement relating to any one or combination of components illustrated in the exemplary operating environment 520.

Aspects of the presently disclosed subject matter are operational with numerous other general purpose or special purpose computing system environments or configurations. Examples of well known computing systems, environments, and/or configurations that may be suitable for use with the this subject matter include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the presently disclosed subject matter may be implemented in the general context of computer-executable instructions, such as program modules, being executed by a computer. Generally, program modules include routines, programs, objects, components, data structures, etc. that perform particular tasks or implement particular abstract data types. Aspects of the presently disclosed subject matter may also be practiced in distributed computing environments where tasks are performed by remote processing devices that are linked through a communications network. In a distributed computing environment, program modules may be located in both local and remote computer storage media including memory storage devices.

An exemplary system for implementing aspects of the presently disclosed subject matter includes a general purpose computing device in the form of a computer 541. Components of computer 541 may include, but are not limited to, a processing unit 559, a system memory 522, and a system bus 521 that couples various system components including the system memory to the processing unit 559. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 541 typically includes a variety of computer readable media. Computer readable media can be any available media that can be accessed by computer 541 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 541. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 522 includes computer storage media in the form of volatile and/or nonvolatile memory such as read only memory (ROM) 523 and random access memory (RAM) 560. A basic input/output system 524 (BIOS), containing the basic routines that help to transfer information between elements within computer 541, such as during start-up, is typically stored in ROM 523. RAM 560 typically contains data and/or program modules that are immediately accessible to and/or presently being operated on by processing unit 559. By way of example, and not limitation, FIG. 7 illustrates operating system 525, application programs 526, other program modules 527, and program data 528.

The computer 541 may also include other removable/non-removable, volatile/nonvolatile computer storage media. By way of example only, FIG. 7 illustrates a hard disk drive 538 that reads from or writes to non-removable, nonvolatile magnetic media, a magnetic disk drive 539 that reads from or writes to a removable, nonvolatile magnetic disk 554, and an optical disk drive 540 that reads from or writes to a removable, nonvolatile optical disk 553 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 538 is typically connected to the system bus 521 through an non-removable memory interface such as interface 534, and magnetic disk drive 539 and optical disk drive 540 are typically connected to the system bus 521 by a removable memory interface, such as interface 535.

The drives and their associated computer storage media discussed above and illustrated in FIG. 9, provide storage of computer readable instructions, data structures, program modules and other data for the computer 541. In FIG. 9, for example, hard disk drive 538 is illustrated as storing operating system 558, application programs 557, other program modules 556, and program data 555. Note that these components can either be the same as or different from operating system 525, application programs 526, other program modules 527, and program data 528. Operating system 558, application programs 557, other program modules 556, and program data 555 are given different numbers here to illustrate that, at a minimum, they are different copies. A user may enter commands and information into the computer 541 through input devices such as a keyboard 551 and pointing device 552, commonly referred to as a mouse, trackball or touch pad. Other input devices (not shown) may include a microphone, joystick, game pad, satellite dish, scanner, or the like. These and other input devices are often connected to the processing unit 559 through a user input interface 536 that is coupled to the system bus, but may be connected by other interface and bus structures, such as a parallel port, game port or a universal serial bus (USB). A monitor 542 or other type of display device is also connected to the system bus 521 via an interface, such as a video interface 532. In addition to the monitor, computers may also include other peripheral output devices such as speakers 544 and printer 543, which may be connected through an output peripheral interface 533.

The computer 541 may operate in a networked environment using logical connections to one or more remote computers, such as a remote computer 546. The remote computer 546 may be a personal computer, a server, a router, a network PC, a peer device or other common network node, and typically includes many or all of the elements described above relative to the computer 541, although only a memory storage device 547 has been illustrated in FIG. 9. The logical connections depicted in FIG. 9 include a local area network (LAN) 545 and a wide area network (WAN) 549, but may also include other networks. Such networking environments are commonplace in offices, enterprise-wide computer networks, intranets and the Internet.

When used in a LAN networking environment, the computer 541 is connected to the LAN 545 through a network interface or adapter 537. When used in a WAN networking environment, the computer 541 typically includes a modem 550 or other means for establishing communications over the WAN 549, such as the Internet. The modem 550, which may be internal or external, may be connected to the system bus 521 via the user input interface 536, or other appropriate mechanism. In a networked environment, program modules depicted relative to the computer 541, or portions thereof, may be stored in the remote memory storage device. By way of example, and not limitation, FIG. 7 illustrates remote application programs 548 as residing on memory device 547. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and nonvolatile memory and/or storage elements), at least one input device, and at least one output device. One or more programs that may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 10:
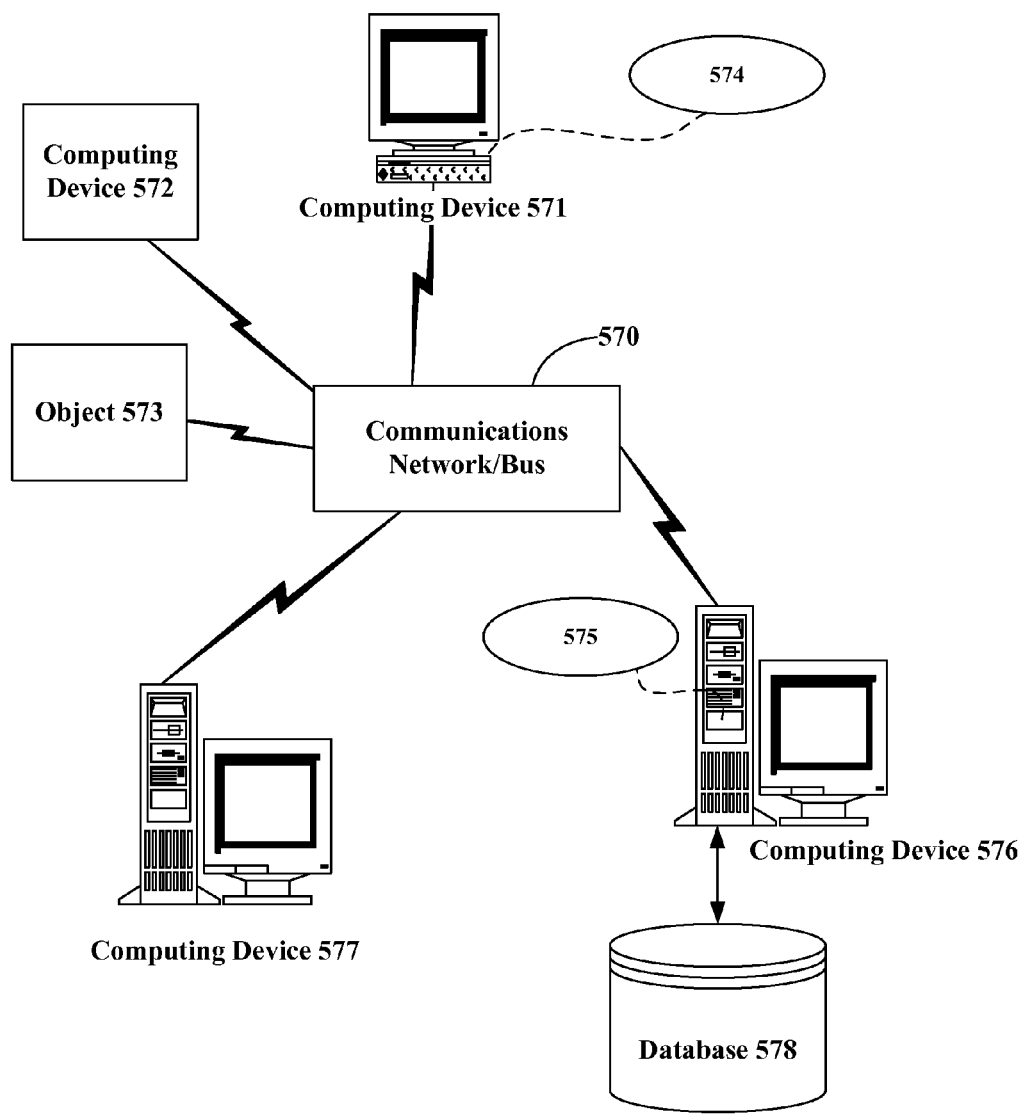
FIG. 10 illustrates an exemplary networked computing environment in which computerized processes may be implemented to perform aspects of the invention.

Referring next to FIG. 10, shown is an exemplary networked computing environment in which many computerized processes may be implemented to perform aspects of the invention. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 10 provides a schematic diagram of an exemplary networked or distributed computing environment. The environment comprises computing devices 571, 572, 576, and 577 as well as objects 573, 574, and 575, and database 578. Each of these entities 571, 572, 573, 574, 575, 576, 577 and 578 may comprise or make use of programs, methods, data stores, programmable logic, etc. The entities 571, 572, 573, 574, 575, 576, 577 and 578 may span portions of the same or different devices such as PDAs, audio/video devices, MP3 players, personal computers, etc. Each entity 571, 572, 573, 574, 575, 576, 577 and 578 can communicate with another entity 571, 572, 573, 574, 575, 576, 577 and 578 by way of the communications network 570. In this regard, any entity may be responsible for the maintenance and updating of a database 578 or other storage element.

This network 570 may itself comprise other computing entities that provide services to the system of FIG. 10, and may itself represent multiple interconnected networks. In accordance with an aspect of the presently disclosed subject matter, each entity 571, 572, 573, 574, 575, 576, 577 and 578 may contain discrete functional program modules that might make use of an API, or other object, software, firmware and/or hardware, to request services of one or more of the other entities 571, 572, 573, 574, 575, 576, 577 and 578.

It can also be appreciated that an object, such as 575, may be hosted on another computing device 576. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 10, any entity 571, 572, 573, 574, 575, 576, 577 and 578 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIGS. 9 and 10, the systems and methods provided herein cannot be construed as limited in any way to a particular computing architecture or operating system. Moreover, while the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A non-transitory computer-readable storage medium having computer-readable instructions comprising a method for:
    selecting at least one action associated with at least one virtual machine (VM);
    determining if one of the at least one VM has any dependencies upon other VMs;
    if so, taking the dependencies into account when the at least one action is performed;
    storing a list of one or more blocked VMs to which any request is prevented from being made, wherein the list of one or more blocked VMs includes the at least one VM associated with the at least one selected action, and wherein the list further includes a VM depending from a blocked VM in the list; and
    preventing each of the blocked and dependent VMs of the list from receiving any requests from a user.

2. The computer-readable storage medium of claim 1, wherein the at least one VM comprises a Java virtual machine.

3. The computer-readable storage medium of claim 1, wherein the at least one action comprises re-boot or do not start.

4. The computer-readable storage medium of claim 1, further comprising instructions for maintaining a do not start list including the VMs that are not to be started.

5. The computer-readable storage medium of claim 1, further comprising instructions for maintaining a list of VMs that are prevented from starting under load.

6. The computer-readable storage medium of claim 5, further comprising instructions for starting the at least one VM based on the associated at least one action.

7. The computer-readable storage medium of claim 6, wherein if a VM is prevented from starting under load, then modifying a plugin on a server and removing the VM, or blocking a transport port of the VM and unblocking the port after the VM is initialized.

8. A non-transitory computer-readable medium having computer-readable instruction to manage virtual machines (VMs), comprising a method for:
    determining a start order for the VMs based on weights associated with the VMs, wherein weights are managed and modified by a publishing module;
    starting the VMs pursuant to the start order;
    storing a list of one or more blocked VMs to which any request is prevented from being made, wherein the list of one or more blocked VMs includes the at least one VM associated with the at least one selected action, and wherein the list further includes a VM depending from a blocked VM in the list; and preventing each of the blocked and dependent VMs of the list from receiving any requests from a user.

9. The computer-readable storage medium of claim 8, wherein the start order is further based on VM dependencies.

10. The computer-readable storage medium of claim 9, further comprising instructions for setting at least one VM dependency prior to starting.

11. The computer-readable storage medium of claim 9, further comprising instructions for setting or modifying at least one VM dependency after starting.

12. The computer-readable storage medium of claim 9, further comprising instructions for starting, stopping, or re-booting at least one VM in accordance with at least one VM dependency.

13. The computer-readable storage medium of claim 8, further comprising instructions for:
   determining at least one VM to be re-booted; and
   determining additional VMs to be re-booted based on the at least one VM to be re-booted.

14. The computer-readable storage medium of claim 8, further comprising instructions for determining at least one VM that cannot start under load, and blocking access to the at least one VM until the at least one VM is fully initialized.

15. A non-transitory computer-readable medium having computer-readable instructions to start a plurality of virtual machines (VMs), comprising a method for:
   maintaining the VMs in a set of servers;
   determining which VMs in a set of servers are to be started;
   storing a list of one or more blocked VMs to which any request is prevented from being made, wherein the list of one or more blocked VMs includes the at least one VM associated with the at least one selected action, and wherein the list further includes a VM depending from a blocked VM in the list;
   starting the VMs in a predetermined order such that weights and dependencies of the VMs are taken into account; and
   preventing each of the blocked and dependent VMs of the list from receiving any requests from a user.

16. The computer-readable storage medium of claim 15, wherein determining which VMs are to be started comprises checking a predetermined list of actions associated with each VM.

17. The computer-readable storage medium of claim 16, wherein the actions comprise start, do not start, do not start under load, or re-boot.

18. The computer-readable storage medium of claim 16, further comprising instructions for receiving updates to the dependencies and predetermined list of actions.

19. The computer-readable storage medium of claim 15, wherein the dependencies of the VMs are based on predetermined weights associated with each VM.

20. The computer-readable storage medium of claim 19, wherein equally weighted VMs are started in parallel.

21. The computer-readable storage medium of claim 15, wherein dependency mapping is used to determine the dependencies.

* * * * *